United States Patent
Wang (10) Patent No.: US 12,302,143 B2
(45) Date of Patent: May 13, 2025

(54) MEASUREMENT METHOD, TERMINAL DEVICE AND NON-TRANSITORY COMPUTER-READABLE STORAGE MEDIUM FOR A MASTER CELL GROUP AND A SECONDARY CELL GROUP

(71) Applicant: GUANGDONG OPPO MOBILE TELECOMMUNICATIONS CORP., LTD., Dongguan (CN)

(72) Inventor: Shukun Wang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 410 days.

(21) Appl. No.: 17/864,654

(22) Filed: Jul. 14, 2022

(65) Prior Publication Data

US 2022/0377583 A1   Nov. 24, 2022

Related U.S. Application Data (63) Continuation of application No. PCT/CN2020/072419, filed on Jan. 16, 2020.

(51) Int. Cl.
*H04W 24/08* (2009.01)
*H04W 24/02* (2009.01)
*H04W 24/10* (2009.01)
*H04W 36/00* (2009.01)
*H04W 48/10* (2009.01)
(Continued)

(52) U.S. Cl.
CPC ................................. *H04W 24/08* (2013.01)

(58) Field of Classification Search
CPC ............. H04W 24/08; H04W 52/0206; H04W 52/0216; H04W 52/0219; H04W 52/0229; H04W 36/0085; H04W 52/028; H04W 36/0094; H04W 76/27; H04W 76/34; H04W 72/04; H04W 24/02; H04W 48/20; H04W 52/0212; H04W 72/231;
(Continued)

(56) References Cited

U.S. PATENT DOCUMENTS

2020/0022215 A1* 1/2020 Takahashi ............. H04W 76/19
2020/0059343 A1* 2/2020 Kim ....................... H04L 5/0098
2020/0112919 A1* 4/2020 Nam ........................ H04L 5/001

FOREIGN PATENT DOCUMENTS

CA   3057416 A1   9/2018
CN   107113891 A   8/2017
(Continued)

OTHER PUBLICATIONS

Priority Review issued in corresponding Chinese application No. 202210768052.8, mailed Jun. 7, 2023.
(Continued)

*Primary Examiner* — Harry H Kim
(74) *Attorney, Agent, or Firm* — BAYES PLLC (57) ABSTRACT

Provided are a measurement method and apparatus, and a terminal device. The method comprises: a terminal device receiving first instruction information sent by a network device, wherein the first instruction information is used to instruct an SCG to enter a first state, and the first state is different from an active state; and the terminal device executing measurement according to a first measurement behavior after the SCG enters the first state.

9 Claims, 3 Drawing Sheets

301
A terminal device receives first indication information sent by a network device, where the first indication information is used to indicate that a SCG enters a first state, and the first state is different from an active state 302
The terminal device performs measurement according to a first measurement behavior after the SCG enters the first state (51) Int. Cl.
| | |
|---|---|
| *H04W 48/20* | (2009.01) |
| *H04W 52/02* | (2009.01) |
| *H04W 72/04* | (2023.01) |
| *H04W 72/231* | (2023.01) |
| *H04W 76/15* | (2018.01) |
| *H04W 76/27* | (2018.01) |
| *H04W 76/34* | (2018.01) |

(58) Field of Classification Search
CPC ..... H04W 24/10; H04W 48/10; H04W 76/15; Y02D 30/70; H04L 5/0053
See application file for complete search history.

(56) References Cited

FOREIGN PATENT DOCUMENTS

| | | |
|---|---|---|
| CN | 110447285 A | 11/2019 |
| WO | 2018174038 A1 | 9/2018 |
| WO | 2018174791 A1 | 9/2018 |

OTHER PUBLICATIONS

First Office Action issued in corresponding Chinese application No. 202210768052.8, mailed Jun. 10, 2023.
"Running CR to 37.340 for CA/DC enhancements", R2-1916642, Source: vivo, Ericsson, 3GPP TSG-RAN2 Meeting #108, Reno, Nevada, USA, Nov. 18-22, 2019, 15 pages.
3GPP TS 37.340 V16.0.0 (Dec. 2019); Technical Specification Group Radio Access Network; Evolved Universal Terrestrial Radio Access (E-UTRA) and NR; Multi-connectivity; Stage 2 (Release 16), 72 pages.
International Search Report from the International Searching Authority Re. PCT/CN2020/072419, mailed Oct. 21, 2020, 4 pages.
Written Opinion of the International Searching Authority Re. PCT/CN2020/072419, mailed Oct. 21, 2020, 6 pages.
3GPP TS 37.340 V17.0.0 (Mar. 2022); Technical Specification Group Radio Access Network; Evolved Universal Terrestrial Radio Access (E-UTRA) and NR; Multi-connectivity; Stage 2 (Release 17), 110 pages.
3GPP TS 38.133 V17.5.0 (Mar. 2022); Technical Specification Group Radio Access Network; NR; Requirements for support of radio resource management (Release 17), 3056 pages.
3GPP TS 38.321 V17.0.0 (Mar. 2022); Technical Specification Group Radio Access Network; NR; Medium Access Control (MAC) protocol specification (Release 17), 221 pages.
3GPP TS 38.331 V17.0.0 (Mar. 2022); Technical Specification Group Radio Access Network; NR; Radio Resource Control (RRC) protocol specification (Release 17), 1217 pages.
Notice of Allowance issued in corresponding Chinese application No. 202210768052.8, mailed Aug. 28, 2023.
First Office Action issued in corresponding European application No. 20914493.0, mailed Sep. 8, 2023.
First Office Action issued in corresponding Japanese application No. 2022-543169, mailed Oct. 6, 2023.
Hearing Notice issued in corresponding Indian application No. 202227043620, mailed Nov. 7, 2023.
First Office Action issued in corresponding Indian application No. 202227043620, mailed Nov. 1, 2022.
Extended European Search Report issued in corresponding European application No. 20914493.0, mailed Nov. 22, 2022.
CATT, "Dormant SCG state", R2-1912118, 3GPP TSG-RAN WG2 Meeting #107bis Chongqing, P.R.China, Oct. 14-Oct. 18, 2019.

\* cited by examiner

MEASUREMENT METHOD, TERMINAL DEVICE AND NON-TRANSITORY COMPUTER-READABLE STORAGE MEDIUM FOR A MASTER CELL GROUP AND A SECONDARY CELL GROUP

CROSS REFERENCE TO RELATED APPLICATION

This application is a continuation of International Application No. PCT/CN2020/072419, entitled "MEASUREMENT METHOD AND APPARATUS, AND TERMINAL DEVICE", filed on Jan. 16, 2020, the content of which is incorporated herein by reference in its entirety.

TECHNICAL FIELD

The embodiments of the present disclosure relate to the field of mobile communication technologies, and in particular, to a measurement method and apparatus, and a terminal device.

BACKGROUND

In order to support energy saving of terminal device and rapid establishment of a Secondary Cell Group (SCG), New Radio (NR) supports concepts of dormancy SCG, or suspend SCG, or deactivated SCG.

At present, after the SCG enters the dormancy behavior, the suspend state or the deactivation state, a measurement behavior of the terminal device is indefinite.

SUMMARY

Embodiments of the present disclosure provide a measurement method and apparatus, and a terminal device.

A measurement method provided in an embodiment of the present disclosure includes:
  receiving, by a terminal device, first indication information sent by a network device, where the first indication information is used to indicate that a SCG enters a first state, and the first state is different from an active state; and
  performing, by the terminal device, measurement according to a first measurement behavior after the SCG enters the first state.

A measurement apparatus provided by an embodiment of the present disclosure includes:
  a receiving unit configured to receive first indication information sent by a network device, where the first indication information is used to indicate that a SCG enters a first state, and the first state is different from an active state; and
  a measurement unit configured to perform measurement according to a first measurement behavior after the SCG enters the first state.

A terminal device provided by an embodiment of the present disclosure includes a processor and a memory. The memory is used for storing a computer program, and the processor is configured to call and run the computer program stored in the memory to perform the measurement method as described above.

A chip provided in the embodiment of the present disclosure is configured to implement the measurement method as described above.

Specifically, the chip includes: a processor, configured to call and run a computer program from a memory to cause a device installed with the chip to perform the measurement method as described above.

A computer-readable storage medium provided in an embodiment of the present disclosure is configured to store a computer program that causes a computer to perform the measurement method as described above.

A computer program product provided in an embodiment of the present disclosure includes computer program instructions that cause a computer to perform the measurement method as described above.

A computer program provided in an embodiment of the present disclosure, when running on a computer, causes the computer to perform the measurement method as described above.

BRIEF DESCRIPTION OF THE DRAWINGS

The drawings described here are used to provide a further understanding of the disclosure and constitute a part of the disclosure. The exemplary embodiments and description of the disclosure are used to explain the disclosure, and do not constitute an improper limitation of the disclosure. In the drawings.

DETAILED DESCRIPTION

The technical solutions in the embodiments of the present disclosure will be described below in connection with the drawings in the embodiments of the present disclosure. Obviously, the embodiments described are part of the embodiments of the present disclosure, but not all the embodiments. All other embodiments obtained by those of ordinary skill in the art based on the embodiments in the present disclosure without creative work fall within the protection scope of the present disclosure.

The technical solutions of the embodiments of the present disclosure can be applied to various communication systems, such as a Long Term Evolution (LTE) system, a LTE Frequency Division Duplex (FDD) system, a LTE Time Division Duplex (TDD) system, a 5G communication systems or a future communication system.

Figure 1:
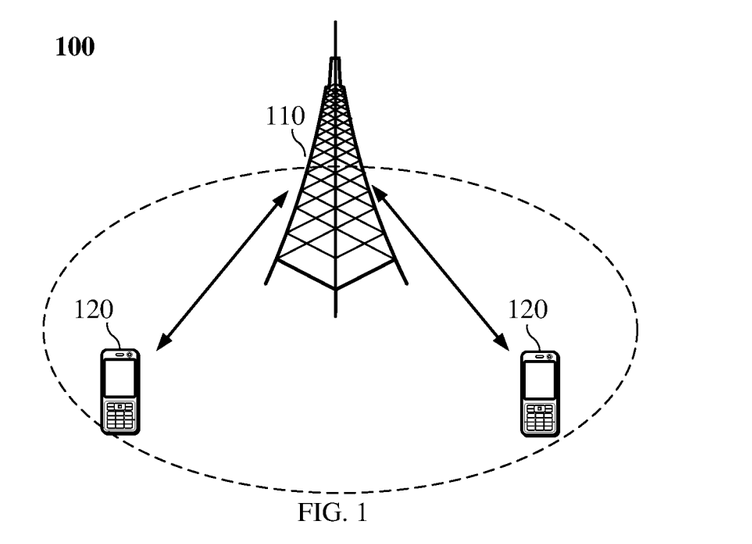
FIG. 1 is a schematic diagram of an architecture of a communication system provided by an embodiment of the present disclosure.

Exemplarily, a communication system 100 in which an embodiment of the present disclosure is applied is as shown in FIG. 1. The communication system 100 may include a network device 110 which can be a device that communicates with terminals 120 (or called communication terminals or terminals). The network device 110 can provide communication coverage for a specific geographic area, and can communicate with terminals located in the coverage area. Optionally, the network device 110 can be an Evolutional Node B (eNB or eNodeB) in an LTE system, or a radio controller in a Cloud Radio Access Network (CRAN), or the network device can be a mobile switching center, a relay station, an access point, an in-vehicle device, a wearable device, a hub, a switch, a bridge, a router, a network side device in a 5G network, a network device in a future communication system, or the like.

The communication system 100 also includes at least one terminal 120 located within the coverage range of the network device 110. As used herein, the terminal includes, but is not limited to, a device configured to receive/send communication signals and/or an Internet of Things (IoT) device, which may be connected via wired lines, such as Public Switched Telephone Networks (PSTN), Digital Subscriber Line (DSL), digital cables, and direct cable connections; and/or via another data connection/network; and/or via a wireless interface, such as cellular networks, wireless local area networks (WLAN), digital TV networks such as DVB-H networks, satellite networks, AM-FM broadcast transmitter; and/or another terminal. A terminal configured to communicate through a wireless interface may be referred to as a "wireless communication terminal", a "wireless terminal" or a "mobile terminal". Examples of the mobile terminal include but are not limited to a satellite or cellular phone; a Personal Communications System (PCS) terminal that can combine a cellular radio phone with data processing, fax, and data communication capabilities; a PDA that may include a radio phone, a pager, Internet/intranet access, a Web browser, a memo pad, a calendar, and/or a Global Positioning System (GPS) receiver; and conventional laptop and/or palmtop receivers or other electronic devices including a radio telephone transceiver. The terminal device may refer to an access terminal, user equipment (UE), a user unit, a user station, a mobile station, a mobile console, a remote station, a remote terminal, a mobile equipment, a user terminal, a terminal, a wireless communication device, a user agent, or a user device. The access terminal may be a cellular phone, a cordless phone, a Session Initiation Protocol (SIP) phone, a wireless local loop (WLL) station, a personal digital assistant (PDA), a wireless communication functional handheld device, a computing device or other processing devices connected to a wireless modem, an in-vehicle device, a wearable device, a terminal in 5G network, a terminal in the future evolution of PLMN, or the like.

Optionally, Device to Device (D2D) communication may be performed between the terminals 120.

Optionally, the 5G system or 5G network may also be referred to as a New Radio (NR) system or NR network.

FIG. 1 exemplarily shows one network device and two terminals. Optionally, the communication system 100 may include multiple network devices and other number of terminals can be included in the coverage of each network device, which is not particularly limited in the embodiments of the present disclosure.

Optionally, the communication system 100 may also include other network entities such as a network controller and a mobility management entity, which are not limited in the embodiments of the present disclosure.

It should be understood that the device with a communication function in the network and/or system of the embodiments of the present disclosure may be referred to as the communication device. Taking the communication system 100 shown in FIG. 1 as an example, the communication device may include a network device 110 and terminals 120 which have the communication function. The network device 110 and the terminals 120 may be the specific devices as described above, which will not be repeated here. The communication device may also include other devices in the communication system 100, such as a network controller, a mobility management entity, and other network entities, which are not limited in the embodiments of the present disclosure.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

In order to facilitate understanding of the technical solutions of the embodiments of the present disclosure, related technologies involved in the embodiments of the present disclosure are described below.

With pursuit of speed, latency, high-speed mobility and energy efficiency, and with the diversity and complexity of services in future life, the 3rd Generation Partnership Project (3GPP) international standards organization has begun to develop 5G. The main application scenarios of 5G include enhanced Mobile Broadband (eMBB), Ultra-Reliable Low-Latency Communications (URLLC), and massive Machine-Type Communications (mMTC).

On the one hand, eMBB is still targeting at obtaining multimedia content, services and data by the users, and the demand therefor is growing very rapidly. On the other hand, since eMBB may be deployed in different scenarios, such as indoors, urban areas, rural areas, etc., the capabilities and requirements thereof are also quite different, they cannot be generalized and must be analyzed in detail in conjunction with specific deployment scenarios. Typical applications of URLLC include industrial automation, power automation, telemedicine operations (surgeries), traffic safety protection, etc. Typical features of mMTC include high connection density, small data volume, delay-insensitive services, low cost and long service life of the module, etc.

In the early deployment of NR, it is difficult to obtain complete NR coverage, and thus the typical network coverage is wide-area LTE coverage and NR island coverage patterns. Moreover, the LTE is largely deployed below 6 GHz, and there is very little spectrum below 6 GHz that can be used for 5G. Therefore, the application of spectrum above 6 GHz must be studied for NR, but the high frequency band has limited coverage and fast signal fading. At the same time, in order to protect mobile operators' early investment in LTE, a work mode of tight interworking between LTE and NR is proposed.

In order to realize 5G network deployment and commercial application as soon as possible, 3GPP first completed the first 5G version, namely EN-DC (LTE-NR Dual Connectivity). In EN-DC, an LTE base station (eNB) acts as a Master Node (MN), and an NR base station (gNB or en-gNB) acts as a Secondary Node (SN). Later in R15, other DC modes will be supported, namely NE-DC, 5GC-EN-DC, NR DC. For EN-DC, a core network with which the access network is connected is EPC, and the core network connected in other DC modes is 5GC.

Figure 2A:
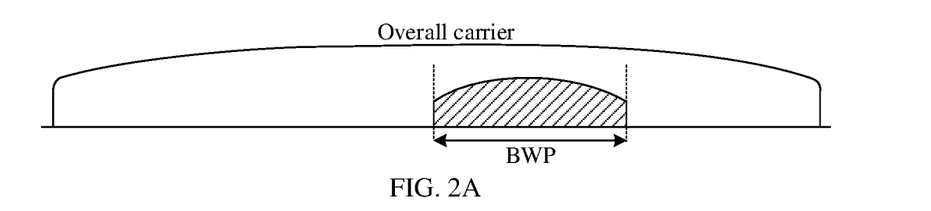
FIG. 2A is a first schematic diagram of a BWP provided by an embodiment of the disclosure.
Figure 2B:
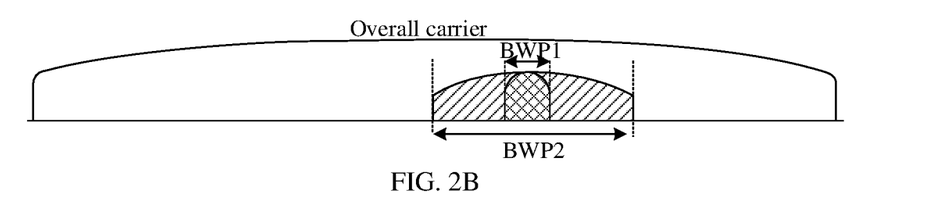
FIG. 2B is a second schematic diagram of a BWP provided by an embodiment of the disclosure.
Figure 2C:
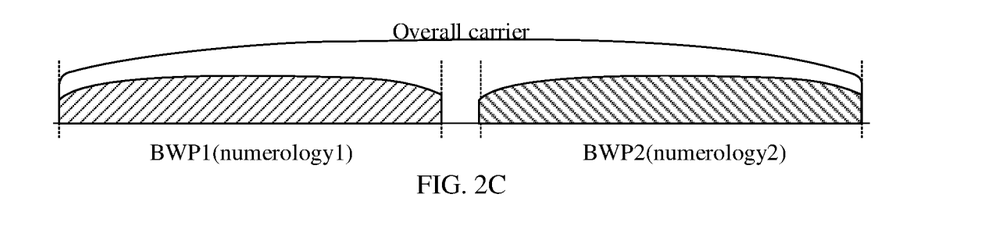
FIG. 2C is a third schematic diagram of a BWP provided by an embodiment of the disclosure.

In 5G, a maximum channel bandwidth can be 400 MHZ, known as a wideband carrier. Compared with the maximum bandwidth of 20M in LTE, the bandwidth of the wideband carrier is very large. If the terminal device keeps working on the wideband carrier, the power consumption of the terminal device is very large. Therefore, it is recommended that a radio frequency (RF) bandwidth of the terminal device can be adjusted according to an actual throughput of the terminal device. As such, concept of a bandwidth part (BWP) is introduced, the motivation of which is to optimize the power consumption of terminal device. For example, if a rate of the terminal device is very low, the terminal device can be configured with a smaller BWP (as shown in FIG. 2A), and if the rate requirement of the terminal device is very high, the terminal device can be configured with a larger BWP (as shown in FIG. 2B). If the terminal device supports a high rate or works in a Carrier Aggregation (CA) mode, the terminal device can be configured with a plurality of BWPs (as shown in FIG. 2C). Another purpose of BWP is to trigger coexistence of multiple numerologies in a cell, as shown in FIG. 2C, where BWP1 corresponds to numerology1, and BWP2 corresponds to numerology2.

Through Radio Resource Control (RRC) dedicated signaling, a terminal can be configured with a maximum of 4 uplink BWPs and a maximum of 4 downlink BWPs, but only one uplink BWP and downlink BWP can be activated at the same time. A first activated BWP among the configured BWPs can be indicated in the RRC dedicated signaling. At the same time, while the terminal is in a connected state, switching between different BWPs can also be performed through Downlink Control Information (DCI). When the carrier in the inactive state enters the active state, the BWP that is activated first is the first activated BWP configured in the RRC dedicated signaling. The configuration parameters of each BWP include:
  subcarrierSpacing;
  cyclicPrefix;
  a first Physical Resource Block (PRB) and a number of continuous PRBs of the BWP (locationAndBandwidth);
  BWP identification (BWP-ID);
  BWP common configuration parameters and dedicated configuration parameters (BWP-Common, BWP-Dedicated).

In the process of Radio Link Monitor (RLM), the terminal performs the RLM only on the active BWP, and it needs not to operate on the inactive BWPs. When switching between different BWPs, there is no need to reset RLM related timer and counter. For Radio Resource Management (RRM) measurement, no matter on which active BWP the terminal sends and receives data, it does not affect the RRM measurement. Also, the terminal only needs to perform Channel Quality Indication (CQI) measurement on the active BWP.

When a carrier is deactivated, and then is activated through a Media Access Control Control Element (MAC CE), an initial BWP that is activated first is the first activated BWP configured in the RRC dedicated signaling.

A value of the BWP ID in the RRC dedicated signaling ranges from 0 to 4, and the BWP with a BWP ID of 0 is the initial BWP by default.

A BWP indicator in DCI includes 2 bits, as shown in Table 1 below. If the number of configured BWPs is less than or equal to 3, the BWP indicator=1, 2, 3, corresponding to BWP ID=1, 2, 3, respectively. If the number of BWPs is 4, the BWP indicator=0, 1, 2, 3, corresponding to the BWPs configured in an index order, respectively. And the network side uses continuous BWP IDs when configuring the BWPs.

TABLE 1

| Value of BWP indicator (2 bits) | BWP |
| --- | --- |
| 00 | First BWP configured by high layers |
| 01 | Second BWP configured by high layers |
| 10 | Third BWP configured by high layers |
| 11 | Fourth BWP configured by high layers |

In order to support energy saving of the terminal device and fast establishment of a Secondary Cell Group (SCG), the concept of dormancy SCG, suspend SCG, or deactivated SCG may be supported. The dormancy SCG means that all cells in the SCG are in a dormancy state, and in the dormancy cells, a Physical Downlink Control Channel (PDCCH) is not monitored, and data transmission and reception are not performed, but the RRM, the CSI measurement, beam management, etc. are performed. For the concept of the deactivated SCG, in the SCG cells, the UE does not monitor the PDCCH, does not perform data transmission and reception, does not perform the CSI measurement and reporting, but performs the RRM. The behavior in the suspend SCG can be the same as the dormancy SCG or the same as the deactivated SCG. The measurement behavior and measurement configuration of the terminal device after the SCG enters any one of the above states is not yet definite. To this end, the following technical solutions of the embodiments of the present disclosure are proposed.

Figure 3:
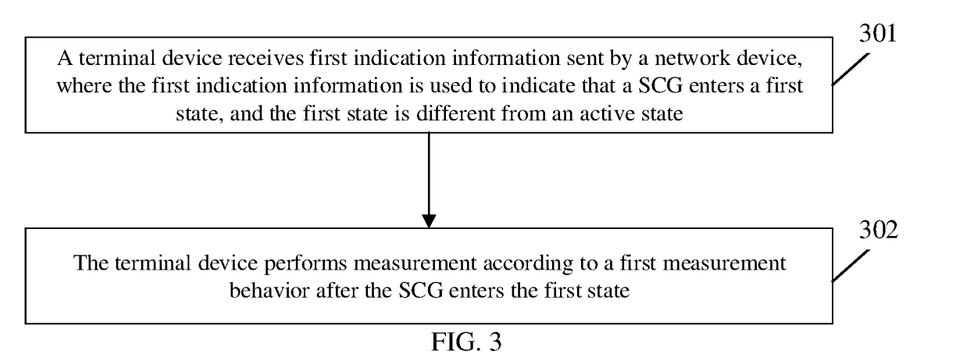
FIG. 3 is a schematic flowchart of a measurement method provided by an embodiment of the present disclosure.

FIG. 3 is a schematic flowchart of a measurement method provided by an embodiment of the present disclosure. As shown in FIG. 3, the measurement method includes the following steps.

In step S301, a terminal device receives first indication information sent by a network device, where the first indication information is used to indicate that a SCG enters a first state, and the first state is different from an active state.

In the embodiments of the present disclosure, the network device may be a base station, such as a gNB.

In an optional implementation of the present disclosure, the first indication information is carried in RRC signaling, in a MAC CE, or in a PDCCH.

In the embodiments of the present disclosure, the terminal device receives the first indication information sent by the network device, and the first indication information is used to indicate that the SCG enters the first state. Herein, the first indication information may indicate that one or more SCGs enter the first state. The one or more SCGs indicated by the first indication information are determined based on SCG configuration carried in the RRC signaling.

Optionally, before the terminal device receives the first indication information sent by the network device, the method further includes: the terminal device receiving RRC signaling sent by the network device, where the RRC signaling carries SCG configuration, and the SCG configuration is used to determine one or more SCGs.

In the embodiments of the present disclosure, the first state is different from the active state. Further, optionally, the active state here refers to an active state with a non-dormancy behavior.

In an optional implementation of the present disclosure, the first state is a deactivated state, or an active state with a dormancy behavior, or a suspend state, or an SCG RRC inactive state.

In the embodiments of the present disclosure, 1) after receiving the first indication information, the terminal device determines that all serving cells of the SCG that are in the active state enter the first state; or 2) after receiving the first indication information, the terminal device determines that all the serving cells of the SCG that are in the active state and have the non-dormancy behavior enter the first state; or 3) after receiving the first indication information, the terminal device determines that all the serving cells of the SCG enter the first state.

In step S302, the terminal device performs measurement according to a first measurement behavior after the SCG enters the first state.

In the embodiments of the present disclosure, after the SCG enters the first state, the measurement behavior performed by the terminal device may include one of the following measurement behaviors:

Measurement behavior 1: the terminal device performs measurement according to first measurement configuration, the first measurement configuration being measurement configuration configured on a MCG side in the RRC connected state; and the terminal device performs the measurement at a service frequency point and/or serving cell of the SCG.

In an optional implementation, a measurement period on the SCG is configured by the network side or predefined in a protocol. That is, the network side may configure a measurement period to control the measurement period on the SCG side.

Measurement behavior 2: the terminal device performs measurement according to first measurement configuration, the first measurement configuration being the measurement configuration configured on the MCG side in the RRC connected state; and the terminal device performs measurement according to second measurement configuration, the second measurement configuration being measurement configuration configured on the SCG side in the RRC connected state.

In an optional implementation, a measurement period on the SCG is configured by the network side or predefined in a protocol. That is, the network side may configure a measurement period to control the measurement period on the SCG side.

Measurement behavior 3: the terminal device performs measurement according to first measurement configuration, the first measurement configuration being measurement configuration configured on the MCG side in the RRC connected state.

Measurement behavior 4: the terminal device performs measurement according to first measurement configuration, the first measurement configuration being measurement configuration configured on the MCG side in the RRC connected state; and the terminal device performs measurement according to a frequency point of cell reselection configuration on the MCG side.

In an optional implementation, the terminal device receives a system broadcast message sent by a PCell of the MCG, where the system broadcast message carries the cell reselection configuration.

Optionally, on the basis of any one of the above measurement behaviors, the terminal device further has the following measurement behavior: after the SCG enters the first state, the terminal device continues to perform RLM measurement and/or CSI measurement and reporting for the serving cell of the SCG; or after the SCG enters the first state, the terminal device stops performing the RLM measurement and/or CSI measurement and reporting for the serving cell of the SCG.

It should be noted that the SCG in the embodiments of the present disclosure refers to a cell group covered by the SN. Generally, the SCG includes one PSCell, and optionally, further includes at least one SCell. The MCG refers to a cell group covered by the MN. Generally, the MCG includes one PCell, and optionally, further includes at least one SCell.

It should be noted that the measurement configuration configured on the MCG side in the RRC connected state in the embodiments of the present disclosure refers to the measurement configuration in the RRC connected state that is configured by the MCG side for the terminal device. Generally, after the terminal device enters the connected state, the terminal device performs the measurement according to this measurement configuration.

It should be noted that the measurement configuration configured on the SCG side in the RRC connected state in the embodiments of the present disclosure refers to the measurement configuration in the RRC connected state that is configured by the SCG side for the terminal device. Generally, after the terminal device enters the connected state, the terminal device performs the measurement according to this measurement configuration.

Figure 4:
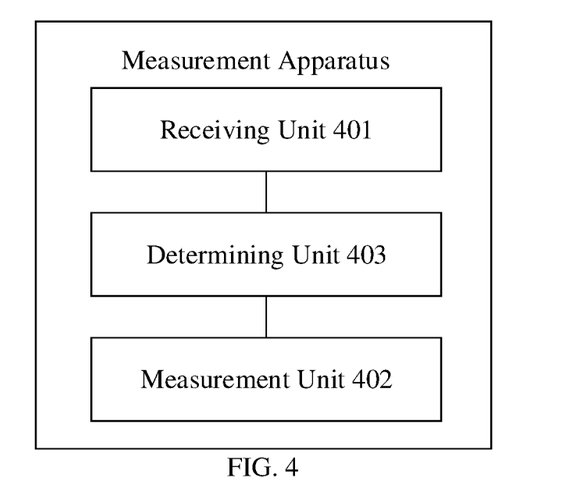
FIG. 4 is a schematic diagram of structural composition of a measurement apparatus provided by an embodiment of the present disclosure.

FIG. 4 is a schematic diagram of structural composition of a measurement apparatus provided by an embodiment of the present disclosure, which is applied to the terminal device. As shown in FIG. 4, the measurement apparatus includes:

a receiving unit 401 configured to receive first indication information sent by a network device, where the first indication information is used to indicate that a SCG enters a first state, and the first state is different from an active state; and a measurement unit 402 configured to perform measurement according to a first measurement behavior after the SCG enters the first state.

In an optional implementation of the present disclosure, the first state is a deactivated state, or an active state with a dormancy behavior, or a suspend state, or an SCG RRC inactive state.

In an optional implementation, the apparatus further includes:

a determining unit 403, configured to determine that all serving cells of the SCG that are in the active state enter the first state; or determine that all serving cells of the SCG that are in the active state enter the first state after the first indication information is received; or determine that all serving cells of the SCG enter the first state.

In an optional implementation, the measurement unit 402 is configured to perform measurement according to first measurement configuration, the first measurement configuration being measurement configuration configured on the MCG side in the RRC connected state; and perform measurement at a service frequency point and/or serving cell of the SCG.

In an optional implementation, the measurement unit 402 is configured to perform measurement according to first measurement configuration, the first measurement configuration being measurement configuration configured on the MCG side in the RRC connected state; and perform measurement according to second measurement configuration, the second measurement configuration being measurement configuration configured on the SCG side in the RRC connected state.

In an optional implementation, a measurement period on the SCG is configured by the network side or predefined in a protocol.

In an optional implementation, the measurement unit 402 is configured to perform measurement according to first measurement configuration, the first measurement configuration being measurement configuration configured on the MCG side in the RRC connected state.

In an optional implementation manner, the measurement unit 402 is configured to perform measurement according to first measurement configuration, the first measurement configuration being measurement configuration configured on the MCG side in the RRC connected state; and perform measurement according to a frequency point of cell reselection configuration on the MCG side.

In an optional implementation, the receiving unit 401 is further configured to receive a system broadcast message sent by a PCell of the MCG, where the system broadcast message carries the cell reselection configuration.

In an optional implementation, the measuring unit 402 is further configured to continue to perform RLM measurement and/or CSI measurement and reporting for the serving cell of the SCG after the SCG enters the first state; or stop performing the RLM measurement and/or CSI measurement and reporting for the serving cell of the SCG after the SCG enters the first state.

In an optional implementation, the first indication information is carried in RRC signaling, in a MAC CE, or in a PDCCH.

It should be understood by those skilled in the art that the relevant description of the above-mentioned measurement apparatus in the embodiments of the present disclosure can be understood with reference to the relevant description of the measurement method in the embodiments of the present disclosure.

Figure 5:
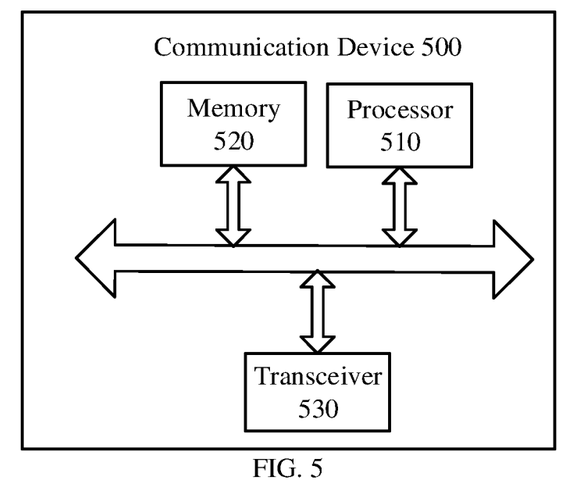
FIG. 5 is a schematic structural diagram of a communication device provided by an embodiment of the present disclosure.

FIG. 5 is a schematic structural diagram of a communication device 500 provided by an embodiment of the present disclosure. The communication device can be a terminal device. The communication device 500 shown in FIG. 5 includes a processor 510 which can invoke and run a computer program from a memory to carry out the methods in the embodiments of the present disclosure.

Optionally, as shown in FIG. 5, the communication device 500 can further include a memory 520. The processor 510 can call and run the computer program from the memory 520 to implement the methods in the embodiments of the present disclosure.

The memory 520 can be a separate device independent of the processor 510, or can be integrated in the processor 510.

Optionally, as shown in FIG. 5, the communication device 500 can further include a transceiver 530, and the processor 510 can control the transceiver 530 to communicate with other devices, and specifically, to transmit information or data to other devices, or to receive information or data transmitted from other devices.

The transceiver 530 can include a transmitter and a receiver. The transceiver 530 can further include an antenna, and the number of the antennas can be one or more.

Optionally, the communication device 500 can specifically be the network device in the embodiments of the present disclosure, and the communication device 500 can carry out the corresponding processes which are implemented by the network device in the methods of the embodiments of the present disclosure, which will not be repeated here for the sake of brevity.

Optionally, the communication device 500 can specifically be a mobile terminal/terminal device in the embodiments of the disclosure, and the communication device 500 can implement the corresponding processes which are implemented by the mobile terminal/terminal device in the methods according to the embodiments of the present disclosure, which will not be repeated here for the sake of brevity.

Figure 6:
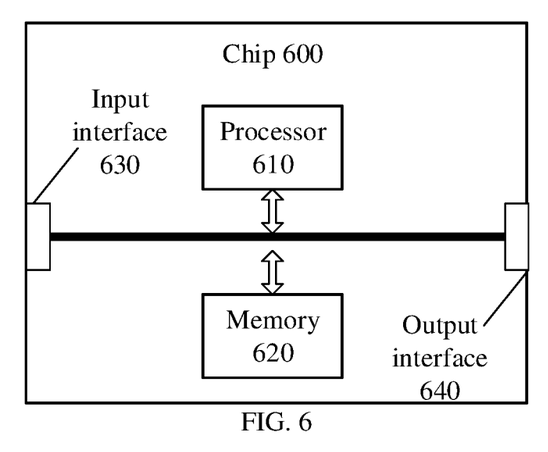
FIG. 6 is a schematic structural diagram of a chip provided by an embodiment of the present disclosure.

FIG. 6 is a schematic structural diagram of a chip according to an embodiment of the present disclosure. The chip 600 shown in FIG. 6 includes a processor 610 which can invoke and run a computer program from a memory to carry out the methods in the embodiments of the present disclosure.

Optionally, as shown in FIG. 6, the chip 600 can further include a memory 620. The processor 610 can call and run the computer program from the memory 620 to implement the methods according to the embodiments of the present disclosure.

The memory 620 can be a separate device independent of the processor 610, or can be integrated in the processor 610.

Optionally, the chip 600 can further include an input interface 630. The processor 610 can control the input interface 630 to communicate with other devices or chips, and specifically, to obtain information or data transmitted by other devices or chips.

Optionally, the chip 600 can further include an output interface 640. The processor 610 can control the output interface 640 to communicate with other devices or chips, and specifically, to output information or data to other devices or chips.

Optionally, the chip can be applied to the network device in the embodiments of the present disclosure, and the chip can carry out the corresponding processes which are implemented by the network device in the methods of the embodiments of the present disclosure, which will not be repeated here for the sake of brevity.

Optionally, the chip can be applied to the mobile terminal/terminal device in the embodiments of the present disclosure, and the chip can implement the corresponding processes which are implemented by the mobile terminal/terminal device in the methods of the embodiments of the present disclosure, which will not be repeated here for the sake of brevity.

It should be understood that the chip mentioned in the embodiments of the present disclosure can also be referred to as a system-level chip, a system chip, a chip system, or a system-on-chip.

Figure 7:
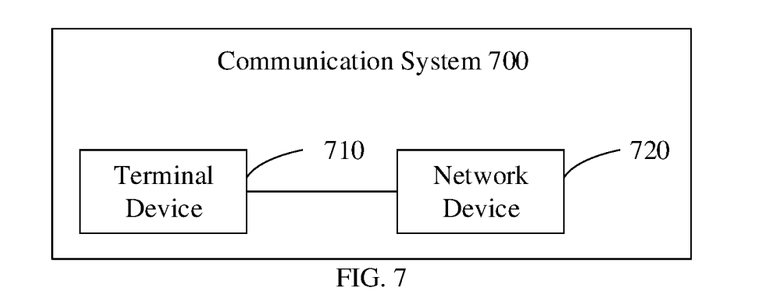
FIG. 7 is a schematic block diagram of a communication system provided by an embodiment of the present disclosure.

FIG. 7 is a schematic block diagram of a communication system 700 according to an embodiment of the present disclosure. As shown in FIG. 7, the communication system 700 includes a terminal device 710 and a network device 720.

The terminal device 710 can be configured to implement the corresponding functions implemented by the terminal device in the above methods, and the network device 720 can be configured to implement the corresponding functions implemented by the network device in the above methods, which will not be repeated here for the sake of brevity.

It should be understood that the processor according to the embodiments of the present disclosure can be an integrated circuit chip with signal processing capability. In the implementations, the steps of the foregoing method embodiments can be completed by an integrated logic circuit of hardware in the processor or by instructions in a form of software. The foregoing processor can be a general-purpose processor, a Digital Signal Processor (DSP), an Application Specific Integrated Circuit (ASIC), a Field Programmable Gate Array (FPGA), other programmable logic devices, discrete gate or transistor logic device, or a discrete hardware component, which can implement the methods, steps, and logical blocks disclosed in the embodiments of the present disclosure. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present disclosure may be a volatile memory or a non-volatile memory, or may include both the volatile and non-volatile memories. The non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM)) and a Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

An embodiment of the present disclosure also provides a computer-readable storage medium for storing a computer program.

Optionally, the computer-readable storage medium can be applied to the network device in the embodiments of the present disclosure, and the computer program causes a computer to perform the corresponding processes which are implemented by the network device in the methods of the embodiments of the present disclosure, which will not be repeated here for the sake of brevity.

Optionally, the computer-readable storage medium can be applied to the mobile terminal/terminal device in the embodiments of the present disclosure, and the computer program causes a computer to perform the corresponding processes which are implemented by the mobile terminal/terminal device in the methods of the embodiments of the present disclosure, which will not be repeated here for the sake of brevity.

An embodiment of the present disclosure also provides a computer program product including computer program instructions.

Optionally, the computer program product can be applied to the network device in the embodiments of the present disclosure, and the computer program instructions cause a computer to perform the corresponding processes implemented by the network device in the methods according to the embodiments of the present disclosure, which will not be repeated here for the sake of brevity.

Optionally, the computer program product can be applied to the mobile terminal/terminal device in the embodiments of the present disclosure, and the computer program instructions cause a computer to perform the corresponding processes which are implemented by the mobile terminal/terminal device in the methods of the embodiments of the present disclosure, which will not be repeated here for the sake of brevity.

An embodiment of the disclosure also provides a computer program.

Optionally, the computer program can be applied to the network device in the embodiments of the present disclosure, and when running on a computer, the computer program causes the computer to perform the corresponding process implemented by the network device in the methods according to the embodiments of the present disclosure, which will not be repeated here for the sake of brevity.

Optionally, the computer program can be applied to the mobile terminal/terminal device in the embodiments of the present disclosure, and when running on a computer, the computer program causes the computer to perform the corresponding processes implemented by the mobile terminal/terminal device in the methods of the embodiments of the present disclosure, which will not be repeated here for the sake of brevity.

With the above technical solutions, the measurement behavior of the terminal device after the SCG enters the first state is clarified, and the first state is a state different from the active state, such as a deactivated state, an active state with a dormancy behavior, a suspend state, or a SCG RRC inactive state. It enables the terminal device to effectively perform measurement with respect to the SCG, while achieving the objective of saving energy for the terminal device.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or in software depends on the specific applications of the technical solutions and design constraints. Various methods can be used by professional technicians to implement the described functions for each specific application, and such implementations should not be considered as going beyond the scope of the present disclosure.

Those skilled in the art can clearly understand that for convenience and conciseness of the description, for the specific operating process of the systems, devices and units described above, reference can be made to corresponding processes in the foregoing method embodiments, which will not be repeated here.

It should be understood that the systems, devices, and methods disclosed in several embodiments of the present disclosure can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may be or may not be physically separated, and the components shown as units may be or may not be physical units, that is, they may be located in one place or may be distributed over multiple network units. Some or all of the units can be selected to achieve the objectives of the solutions of the embodiments according to actual requirements.

In addition, the functional units in the embodiments of the present disclosure can be integrated into one processing unit, or each of the units can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which enable a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. A measurement method, comprising:
receiving, by a terminal device, first indication information sent by a network device, wherein the first indication information is used to indicate that a Secondary Cell Group (SCG) enters a first state, and the first state is a deactivated state; and
performing, by the terminal device, measurement according to a first measurement behavior after the SCG enters the first state,
wherein the performing the measurement according to the first measurement behavior comprises:
performing the measurement by the terminal device according to first measurement configuration, wherein the first measurement configuration is measurement configuration configured on a Master Cell Group (MCG) side; and
performing the measurement by the terminal device according to second measurement configuration, wherein the second measurement configuration is measurement configuration configured on the SCG side.

2. The method according to claim 1, further comprising:
determining, by the terminal device, that all serving cells of the SCG that are in the active state enter the first state after receiving the first indication information; or
determining, by the terminal device, that all serving cells of the SCG that are in the active state and have a non-dormancy behavior enter the first state after receiving the first indication information; or
determining, by the terminal device, that all the serving cells of the SCG enter the first state after receiving the first indication information.

3. The method according to claim 1, wherein the performing, by the terminal device, the measurement according to the first measurement behavior after the SCG enters the first state further comprises:
continuing to perform Radio Link Monitor (RLM) measurement and/or Channel State Information (CSI) measurement and reporting for a serving cell of the SCG by the terminal device after the SCG enters the first state; or
stopping performing the RLM measurement and/or CSI measurement and reporting for the serving cell of the SCG by the terminal device after the SCG enters the first state.

4. The method according to claim 1, wherein the first indication information is carried in Radio Resource Control (RRC) signaling, in a Media Access Control Control Element (MAC CE), or in a Physical Downlink Control Channel (PDCCH).

5. A terminal device, comprising:
a transceiver;
a processor; and
a memory configured to store a computer program executable by the processor,
wherein the transceiver is configured to receive first indication information sent by a network device, wherein the first indication information is used to indicate that a Secondary Cell Group (SCG) enters a first state, and the first state is a deactivated state; and
the processor is configured to perform measurement according to a first measurement behavior after the SCG enters the first state,
wherein the processor is configured to perform the measurement according to first measurement configuration, the first measurement configuration being measurement configuration configured on a Master Cell Group (MCG) side; and perform the measurement according to second measurement configuration, the second measurement configuration being measurement configuration configured on the SCG side.

6. The terminal device according to claim 5, wherein the processor is further configured to determine that all serving cells of the SCG that are in the active state enter the first state after the first indication information is received; or determine that all the serving cells of the SCG that are in the active state enter the first state after the first indication information is received; or determine that all serving cells of the SCG enter the first state after the first indication information is received.

7. The terminal device according to claim 5, wherein the processor is further configured to continue to perform Radio Link Monitor (RLM) measurement and/or Channel State Information (CSI) measurement and reporting for a serving cell of the SCG after the SCG enters the first state; or stop performing the RLM measurement and/or CSI measurement and reporting for the serving cell of the SCG after the SCG enters the first state.

8. The terminal device according to claim 5, wherein the first indication information is carried in Radio Resource Control (RRC) signaling, in a Media Access Control Control Element (MAC CE), or in a Physical Downlink Control Channel (PDCCH).

9. A non-transitory computer-readable storage medium for storing a computer program that causes a computer to perform operations comprising:

receiving first indication information sent by a network device, wherein the first indication information is used to indicate that a Secondary Cell Group (SCG) enters a first state, and the first state is a deactivated state; and performing measurement according to a first measurement behavior after the SCG enters the first state, wherein the performing the measurement according to the first measurement behavior comprises:

performing the measurement according to first measurement configuration, wherein the first measurement configuration is measurement configuration configured on a Master Cell Group (MCG) side; and performing the measurement according to second measurement configuration, wherein the second measurement configuration is measurement configuration configured on the SCG side.

\* \* \* \* \*